(12) United States Patent
Kuhnert et al.

(10) Patent No.: US 8,099,225 B2
(45) Date of Patent: Jan. 17, 2012

(54) FUEL INJECTION SYSTEM AND METHOD FOR INJECTING FUEL

(75) Inventors: Christian Kuhnert, Vaihingen/Enz (DE); Andreas Bartsch, Stuttgart (DE); Falco Sengebusch, Stuttgart-Feuerbach (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 12/532,340

(22) PCT Filed: Jan. 28, 2008

(86) PCT No.: PCT/EP2008/050961
§ 371 (c)(1),
(2), (4) Date: Sep. 21, 2009

(87) PCT Pub. No.: WO2008/116679
PCT Pub. Date: Oct. 2, 2008

(65) Prior Publication Data
US 2010/0131175 A1      May 27, 2010

(30) Foreign Application Priority Data
Mar. 27, 2007   (DE) .................. 10 2007 014 502

(51) Int. Cl.
*F02M 51/00*   (2006.01)

(52) U.S. Cl. ......... 701/103; 701/107; 123/478; 123/490
(58) Field of Classification Search .................. 123/472, 123/478, 490; 701/105, 107, 111; 310/317
See application file for complete search history.

(56) References Cited

U.S. PATENT DOCUMENTS

| | | | | |
|---|---|---|---|---|
| 4,767,959 | A * | 8/1988 | Sakakibara et al. | 310/317 |
| 6,078,198 | A * | 6/2000 | Gerken et al. | 327/111 |
| 6,212,053 | B1 * | 4/2001 | Hoffmann et al. | 361/169.1 |
| 2006/0038463 | A1 | 2/2006 | Marzahn | |
| 2006/0279592 | A1 | 12/2006 | Nagase | |
| 2008/0006243 | A1 * | 1/2008 | Fujii | 123/472 |
| 2008/0149072 | A1 * | 6/2008 | Rottenwohrer et al. | 123/478 |
| 2009/0091212 | A1 * | 4/2009 | Ripoll et al. | 310/317 |
| 2010/0032225 | A1 * | 2/2010 | Oohashi et al. | 180/219 |

FOREIGN PATENT DOCUMENTS

| | | |
|---|---|---|
| DE | 10314566 A1 | 11/2003 |
| DE | 102006000288 A1 | 12/2006 |
| EP | 1628010 A2 | 2/2006 |
| EP | 1689004 A1 | 8/2006 |
| GB | 2334164 A | 8/1999 |

* cited by examiner

*Primary Examiner* — Hai Huynh
(74) *Attorney, Agent, or Firm* — Ronald E. Greigg

(57) ABSTRACT

The invention relates to a fuel injection system having at least one fuel injector, which includes an electrically operable actuator. In order to reduce the hydraulic distances between two injections, a voltage-smoothing or voltage-dampening electric device is connected in parallel to the actuator.

6 Claims, 1 Drawing Sheet

FUEL INJECTION SYSTEM AND METHOD FOR INJECTING FUEL

CROSS-REFERENCE TO RELATED APPLICATION

This application is a 35 USC 371 application of PCT/EP2008/050961 filed on Jan. 28, 2008.

BACKGROUND OF THE INVENTION

Field of the Invention

The invention relates to a fuel injection system, having at least one fuel injector which includes an electrically actuatable actuator. The invention further relates to a method for injecting fuel from at least one fuel injector that includes an electrically actuatable actuator to which a voltage is applied.

The fuel injector serves to inject fuel into a combustion chamber of an internal combustion engine. Preferably, the fuel injection system includes a plurality of fuel injectors, which are triggered via a control unit.

OBJECT AND SUMMARY OF THE INVENTION

It is the object of the invention to reduce the hydraulic spacings between two injections.

The object is attained in a fuel injection system, having at least one fuel injector which includes an electrically actuatable actuator, in that a voltage-smoothing or voltage-damping electrical device is connected parallel to the actuator. In an injection, a pressure wave is introduced into the fuel injection system. As a result, a high-frequency pressure fluctuation is tripped, which excites the actuator subjected to pressure to fluctuate. The actuator is preferably a piezoelectric actuator, which is subjected to pressure and is likewise excited to oscillation by the high-frequency pressure fluctuation, so that a voltage applied to the actuator fluctuates. The ensuing injection is influenced by the state in which the actuator is located at the onset of the triggering. The pressure wave has an influence on the quantity of the ensuing injection and is the tripper of a bulk wave, which is created as a result of pressure fluctuations and acts on the actuator. The bulk wave is the term for the course of the quantity over the chronological spacing of the injections. With the voltage-smoothing or voltage-damping electrical device connected according to the invention, the voltage that is applied to the actuator is smoothed, and thus the bulk wave is likewise smoothed or damped. In one essential aspect of the invention, via electrical oscillating circuits, a damping circuit is implemented by which the amplitudes of bulk waves in the fuel injection system can be reduced markedly.

A preferred exemplary embodiment of the fuel injection system is characterized in that the voltage-smoothing or voltage-damping electrical device includes a capacitor. The capacitor makes it possible to buffer the voltage that is applied to the actuator. As a result, the amplitude of the bulk wave can be lessened or reduced.

A further preferred exemplary embodiment of the fuel injection system is characterized in that the voltage-smoothing or voltage-damping electrical device includes a capacitor, a coil, and/or a resistor. Especially preferably, a coil and a resistor, a resistor and a capacitor, or a coil and a resistor are combined in a sieve member.

A further preferred exemplary embodiment of the fuel injection system is characterized in that a switch device is connected in series with the voltage-smoothing or voltage-damping electrical device. The switch device serves to switch the voltage-smoothing or voltage-damping electrical device on and off in a targeted way. This offers the advantage that the smoothing of the voltage can be performed only between two triggering events. The switch device may be integrated with a control unit.

A further preferred exemplary embodiment of the fuel injection system is characterized in that a control unit is connected parallel to the actuator and to the voltage-smoothing or voltage-damping electrical device. The control unit serves to trigger the actuator, in order to trip and/or terminate an injection.

In a method for injecting fuel from at least one fuel injector, which includes an electrically actuatable actuator to which a voltage is applied, the object stated above is attained in that the voltage which is applied to the actuator is smoothed. As a result, a high-frequency pressure fluctuation is tripped that excites the actuator, subjected to pressure, to oscillate, so that the voltage applied to the actuator fluctuates. The ensuing injection is affected by the state in which the actuator is located at the onset of the triggering. Thus the pressure wave affects the quantity of the ensuing injection. According to the invention, the voltage that is applied to the actuator is smoothed, so that the bulk wave is likewise smoothed or damped.

A preferred exemplary embodiment of the method is characterized in that via electrical oscillating circuits, a damping circuit is implemented by which the amplitudes of bulk waves in a fuel injection system as described above can be reduced markedly. The method of the invention makes it possible to reduce the amplitudes of the bulk waves.

A further preferred exemplary embodiment of the method is characterized in that the voltage-smoothing or voltage-damping electrical device is switched on in a targeted way between two triggering events of the actuator. This offers the advantage that the smoothing of the voltage is effected only between two triggering events.

Further advantages, characteristics and details of the invention will become apparent from the ensuing description, in which various exemplary embodiments are described in detail in conjunction with the drawing.

BRIEF DESCRIPTION OF THE DRAWING

F*ig*. 1 shows a schematic, highly simplified view of a fuel injection system according to the invention.

DESCRIPTION OF THE PREFERRED EMBODIMENTS

Figure 1:
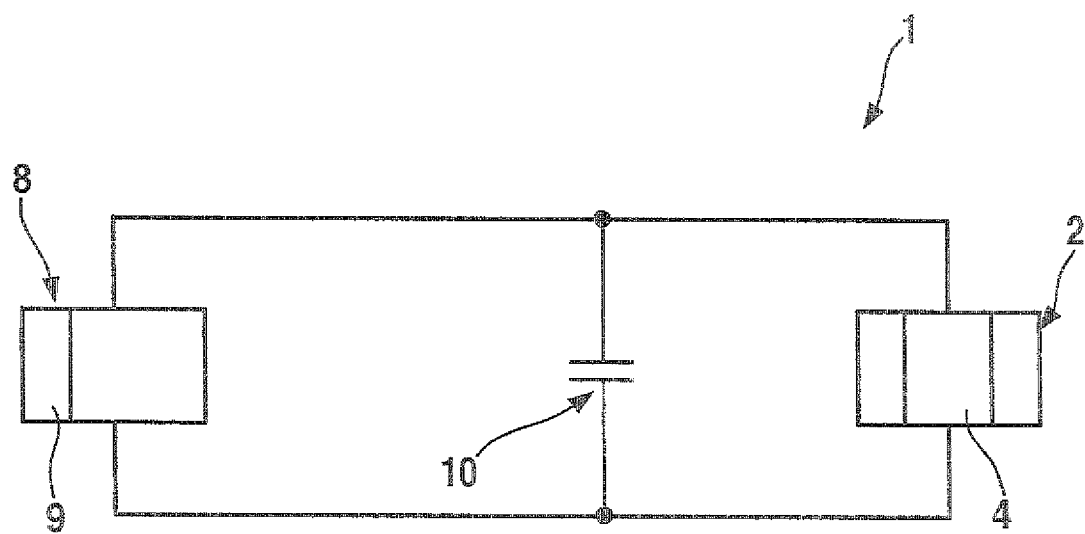

In the accompanying drawing, a fuel injection system 1 is shown schematically and in highly simplified form. The fuel injection system 1 includes a high-pressure fuel reservoir or a high-pressure fuel source, either of which is also known as a common rail. A plurality of fuel injectors, of which one fuel injector 2 is shown in the accompanying drawing, are connected to the high-pressure fuel reservoir. The fuel injectors serve to inject fuel into the combustion chamber of an internal combustion engine.

The fuel injector 2 includes a nozzle needle (not shown), which in a targeted way uncovers an injection port in an injector housing, in order to inject fuel. The opening and/or closing motion of the nozzle needle is controlled with the aid of an actuator 4. The actuator 4 is a piezoelectric actuator, which is connected to a voltage source. When current is supplied to the piezoelectric actuator 4, it expands. Analogously, when the piezoelectric actuator is compressed, a voltage is generated in it. A control unit 8 is connected parallel to the actuator 4 and serves to trigger the actuator 4.

By means of an injection, a high-frequency pressure fluctuation is tripped in the applicable actuator. This causes the piezoelectric actuator 4, which is subjected to high pressure, to be excited, and causes the voltage applied to the piezoelectric actuator 4 to fluctuate. An ensuing injection is affected by the state in which the actuator 4 is located at the onset of the triggering by the control unit 8.

A voltage-smoothing electrical device 10 is connected parallel to the actuator 4 and to the control unit 8. The voltage-smoothing electrical device 10 is for example an LC sieve member, which includes a coil and a resistor, or an RC sieve member, which includes a resistor and a capacitor.

In a preferred exemplary embodiment, a capacitor is used as the voltage-smoothing electrical device 10. The parallel-connected capacitor serves to buffer the voltage applied to the actuator 4. As a result, the applied voltage can be smoothed. In the example shown, the amplitude of the bulk wave is reduced.

In a further aspect of the invention, a switch device 9 is provided, which serves to switch the above-described damping circuit on and off. This has the advantage that the smoothing of the voltage takes place only between two triggering events of the actuator 4. In the exemplary embodiment shown, the switch device 9 is integrated with the control unit 8. The switch device 9 associated with the voltage-smoothing electrical device 10 may, however, also be embodied as a separate component.

The foregoing relates to the preferred exemplary embodiments of the invention, it being understood that other variants and embodiments thereof are possible within the spirit and scope of the invention, the latter being defined by the appended claims.

The invention claimed is:

1. A method for injecting fuel from at least one fuel injector, which includes an electrically actuatable actuator comprising the steps of;
   applying a voltage to the electrically actuatable actuator;
   smoothing the voltage which is applied to the actuator; and
   implementing a damping circuit via electrical oscillating circuits, by said damping circuit amplitudes of bulk waves in a fuel injection system can be reduced markedly,
   wherein the fuel injection system has at least one fuel injector which includes an electrically actuatable actuator and a voltage-smoothing or voltage-damping electrical device connected in parallel to the actuator.

2. The method as defined by claim 1, wherein the voltage-smoothing or voltage-damping electrical device is switched on in a targeted way between two triggering events of the actuator.

3. The method as defined by claim 1, wherein the voltage-smoothing or voltage-damping electrical device includes a capacitor.

4. The method as defined by claim 1, wherein the voltage-smoothing or voltage-damping electrical device includes a capacitor, a coil, and/or a resistor.

5. The method as defined by claim 1, wherein a switch device is connected in series with the voltage-smoothing or voltage-damping electrical device.

6. The method as defined by claim 1, wherein a control unit is connected parallel to the actuator and to the voltage-smoothing or voltage-damping electrical device.

* * * * *